N. F. GILMAN.
Railway Car-Truck.

No. 206,722. Patented Aug. 6, 1878.

WITNESSES:
C. Neveux
C. Sedgwick

INVENTOR:
N. F. Gilman
BY Munn & Co.
ATTORNEYS.

UNITED STATES PATENT OFFICE.

NATHANIEL F. GILMAN, OF ROCHESTER, MINNESOTA.

IMPROVEMENT IN RAILWAY-CAR TRUCKS.

Specification forming part of Letters Patent No. 206,722, dated August 6, 1878; application filed April 12, 1878.

*To all whom it may concern:*

Figure 1:
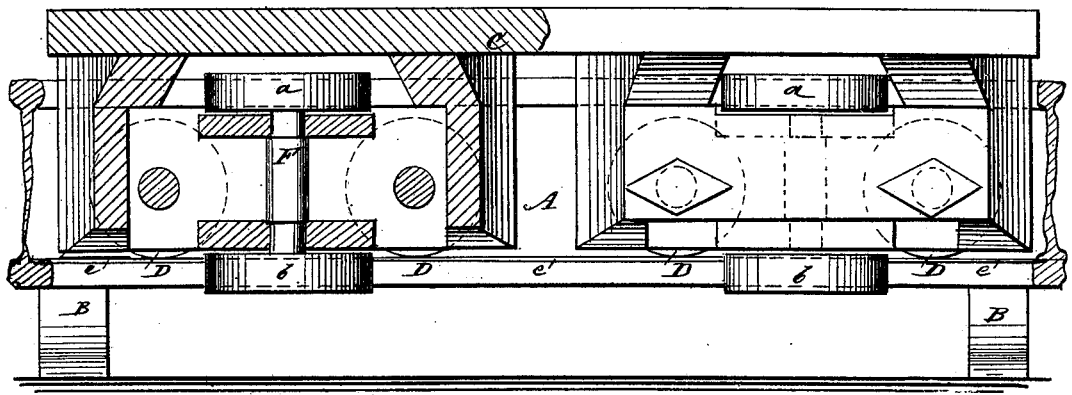
Figure 2:
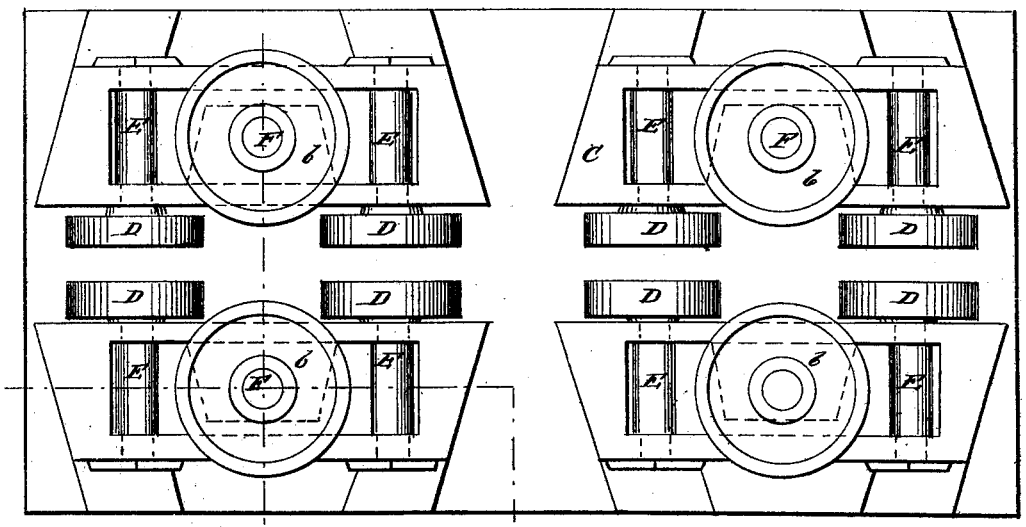
Figure 3:
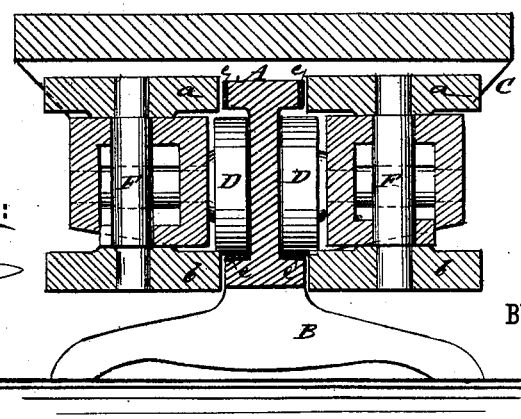

Be it known that I, NATHANIEL F. GILMAN, of Rochester, in the county of Olmsted and State of Minnesota, have invented a new and Improved Railway System, of which the following is a specification:

Figure 1 is a side elevation, partly in section, of a truck and portion of track illustrating my improvement. Fig. 2 is an inverted plan view of the truck. Fig. 3 is a transverse section of my improved truck and track.

Similar letters of reference indicate corresponding parts.

The object of my invention is to provide a safe and economical railway system.

The invention will first be described in connection with the drawing, and then pointed out in the claim.

Referring to the drawing, A is a beam, which is I-shaped in cross-section, and is of sufficient strength and rigidity to support a train of cars. This beam is supported by iron posts.

The track consists entirely of single I-beams secured together at the ends. The truck which runs upon the track thus formed consists of a frame, C, which straddles the track and carries two or more sets of wheels, each set of which is composed of four wheels, D, two on each side of the beam A, placed on horizontal axles E, which are journaled in the frame C. These wheels run on the upper surface of the lower flange of the I-beam A, and nearly touch the upper flange of the beam. They support the load and prevent the truck from rising.

Between the axles E there are vertical axles F, one on each side of the beam, which axles are journaled in the frame C. Wheels *a b* are secured to these axles and run against the edges of the flanges of the beam, and prevent the truck from tipping and lateral movement.

The surface of the beams upon which the wheels run is protected by steel strips, which prevent undue wear.

By the construction above described I am enabled to build a road that occupies little space and is perfectly safe.

The road being elevated three or four feet above the ground-surface, it cannot be blocked by snow, and no labor is required to keep down grass or weeds, as under the present system.

The abondanment of earth embankments prevents all danger of washing out, as in the present system.

Having thus described my invention, I claim as new and desire to secure by Letters Patent—

The truck formed of the frame C, wheels D on horizontal axles E, and wheels *a b* on vertical axles F, the wheels D bearing on the top of lower flange of a single I-beam, A, and the wheels *a b* bearing, respectively, on the side edges of the upper and lower flanges, as and for the purpose specified.

NATHANIEL F. GILMAN.

Witnesses:
WM. M. PURVIS,
L. H. HENNASON.